May 13, 1958 W. W. GREER 2,834,630
MAGNETIC FISHING TOOL
Filed March 16, 1955 2 Sheets-Sheet 1

INVENTOR.
W. W. Greer
BY Jerry Dunlap
ATTORNEY

May 13, 1958 W. W. GREER 2,834,630
MAGNETIC FISHING TOOL
Filed March 16, 1955 2 Sheets-Sheet 2

INVENTOR.
W. W. Greer
BY
Jerry Dunlap
ATTORNEY

United States Patent Office 2,834,630
Patented May 13, 1958

2,834,630
MAGNETIC FISHING TOOL

Warner W. Greer, Oklahoma City, Okla.

Application March 16, 1955, Serial No. 494,733

16 Claims. (Cl. 294—65.5)

This invention relates to improvements in fishing tools of the type used in the oil and gas well drilling industry, and more particularly, but not by way of limitation, to an improved magnetic fishing tool. This application is a continuation-in-part of applicant's co-pending application entitled "Permanent Magnet Fishing Tool" filed April 14, 1954, Serial No. 423,174, now abandoned.

As it is well known in the oil and gas well drilling industry, portions of a drilling string, such as the cones and bearings of rotary drill bits, are frequently lost in a well bore during drilling operations. When this occurs, it is necessary to remove the drill string and retrieve the lost metallic parts, since metal pieces in the bottom of a well bore will frequently cause excessive damage to a drill bit. These lost parts are commonly called "fish" and are recovered by a fishing tool lowered through the well bore by a string of drill pipe, or a wire line.

In recent years it has been the practice to utilize a fishing tool having either a permanent magnet or an electromagnetic unit therein for attracting and holding the fish. The electromagnetic fishing tools are ordinarily cumbersome and somewhat impractical to use since they must have a supply of electrical energy either contained within the tool or supplied to the tool from the surface of the well. Therefore, the present day fishing tools ordinarily contain permanent magnets.

The most common permanent magnet tool utilizes a permanent magnet core surrounded by a sleeve of magnetic material, with the upper end of the magnet core connected to the magnetic sleeve. The magnetic unit is rigidly secured in the tool and the driller must rely upon the "feel" of the drill string to determine when the tool has contacted the fish. Also, the magnetic flux generated by the permanent magnet is concentrated at the center of the permanent magnet, whereby the capacity of the tool for picking up a plurality of fish is definitely limited. Furthermore, the washing fluid is circulated through the tool in such a manner that small metal particles frequently lodge in the circulating passageways and short-circuit the magnetic unit, thereby reducing the service life and strength of the magnet core.

The present invention contemplates a novel permanent magnetic fishing tool wherein the magnetic unit is slidingly disposed in the tool in a manner to cut off the circulating fluid when a fish is contacted, thereby notifying the driller of the action of the tool. It is also contemplated to provide a magnetic unit wherein the flux concentration is disbursed over the maximum area to provide a fishing tool capable of holding the maximum number of fish. The present construction also eliminates the possibility of metal particles becoming lodged in the fluid passageways of the tool where they can short-circuit the magnetic unit.

An important object of this invention is to provide a magnetic fishing tool having the maximum holding capacity.

Another object of this invention is to provide a permanent magnet fishing tool which will notify the driller when a fish has been contacted.

A further object of this invention is to provide a fishing tool having a magnetic circuit which will not be easily short-circuited.

Another object of this invention is to provide a magnetic fishing tool which will attract and hold several fish.

Another object of this invention is to facilitate the recovery of lost metallic articles in an oil or gas well bore.

A still further object of this invention is to provide a magnetic fishing tool having a long service life and which may be economically manufactured.

Other objects and advantages of the invention will be evident from the following detailed description, read in conjunction with the accompanying drawings, which illustrate my invention.

Figure 1:
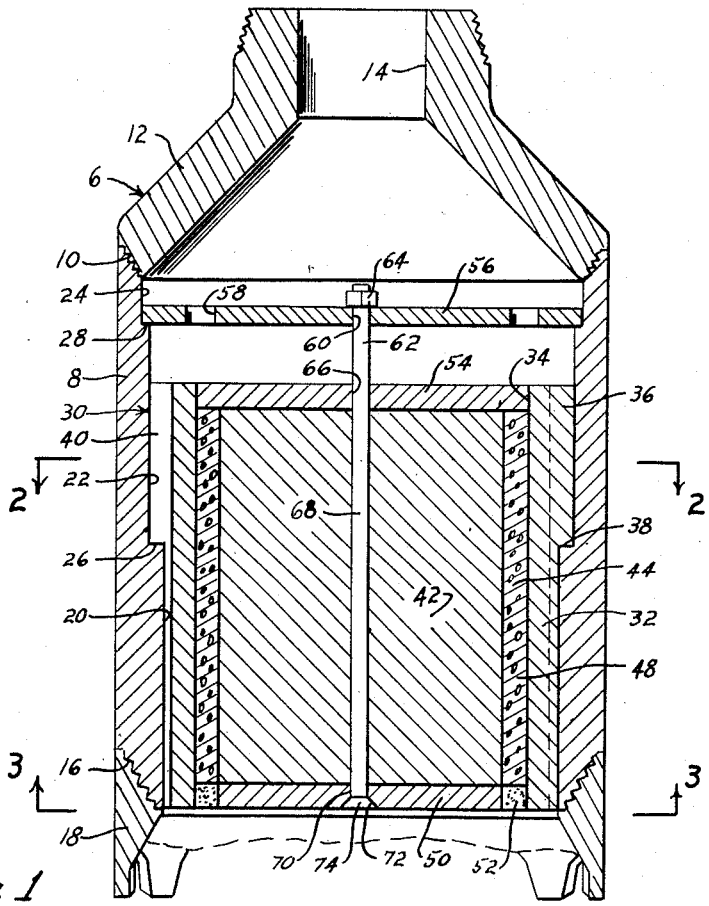
Figure 1 is a vertical sectional view through the entire fishing tool showing the magnetic unit in its lowermost operating position.
Figure 2:
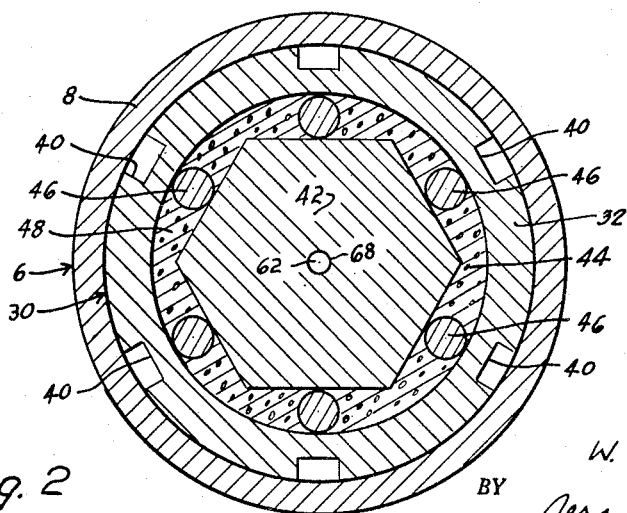
Figure 2 is a sectional view as taken along lines 2—2 of Figure 1.

Referring to the drawings in detail, and particularly Figures 1 and 2, reference character 6 generally designates my novel fishing tool comprising a cylindrical housing 8 having threads 10 on the upper end thereof. The threads 10 are engaged by a sub 12 extending upwardly from the housing 8 for connection with a string of drill pipe (not shown). The sub 12 has an inner bore 14 therethrough of varying diameters to conduct washing fluid to the housing 8, as will be more fully hereinafter set forth. It should also be noted that the sub 12 is ordinarily welded (not shown) to the upper end of the housing 8, as well as being connected by the threads 10, to prevent separation of the tool 6 during operation.

Threads 16 are also provided on the lower end of the housing 8 to receive a suitable reamer or mill 18. The mill 18 may also be welded (not shown) to the housing 8, and is utilized for reaming a weld bore, as well as moving articles into the lower end of the housing 8, as will be more fully hereinafter set forth.

A bore 20 extends longitudinally through the housing 8 and is provided with two progressively larger counter-bores 22 and 24 in the upper portion thereof. The counter-bore 22 provides an upwardly facing circumferential shoulder 26 in the central portion of the housing 8, and the counter-bore 24 provides an upwardly facing circumferential shoulder 28 near the upper end of the housing 8. A magnetic unit, generally indicated at 30, is reciprocally disposed in the bore 20 and counter-bore 22 to attract and hold the articles being fished.

The magnetic unit 30 comprises a tubular sleeve 32 having a bore 34 extending longitudinally therethrough. The upper portion 36 of the sleeve 32 is of increased diameter to provide a sliding fit thereof in the counter bore 22. A downwardly facing circumferential shoulder 38 is formed at the lower end of the head portion 36 and is of a size to rest on the shoulder 26 of the housing 8 for supporting the magnetic unit 30 in the housing 8. A plurality of circumferentially spaced grooves 40 are formed in the outer surface of the sleeve 32 and extend throughout the length of the sleeve. The grooves 40 form passageways for the downward flow of washing fluid through the tool 6 as will be hereinafter described. The complete sleeve 32 is preferably formed out of a high permeability ferro-magnetic material of low retentivity.

A magnet core 42 is secured in the inner bore 34 of the sleeve 32. The core 42 is preferably formed of a magnetic material having high retentivity and field strength properties, and may be of any desired cross sectional configuration but is preferably in the shape of a regular prism, such as the hexagonal prism shown in the drawings. However, the outer diameter of the core 42 is smaller than the diameter of the bore 34 to provide a substantially annular space 44 between the core 42 and the sleeve 32. A plurality of vertical supporting rods 46 (Figure 2) are secured to the inner wall of sleeve 32 in circumferentially spaced relation along the bore 34 intermediate the lateral edges of the hexagonal core 42 to retain the core 42 out of direct contact with the sleeve 32. The rods 46 are constructed of a non-magnetic material, such as stainless steel or brass, and may be secured at points along their lengths to the inner wall of sleeve 32 in any desired manner such as welding or brazing. The primary purpose of the rods 46 is to maintain a spaced relationship between sleeve 32 and core 42. Alternatively or in addition, the space 44 may be filled with a substantially non-porous cement or plastic material 48, such as plaster of Paris.

The lower end of the magnet 42 is covered by a pole plate 50 of magnetic material secured to the lower ends of rods 46 and also secured to the lower end of the sleeve 32 by means of a weld 52. The weld 52 is made from a welding rod material which is substantially non-magnetic. The pole plate 50 is preferably the same cross-sectional size as the lower end of the core 42 and supports the core 42 in the sleeve 32. Also, the plate 50 should be made of a tough, wear-resistant material to protect the lower end of the magnet core 42 from contact with the lost articles, as will be more fully hereinafter set forth. The connection of plate 50 to the lower ends of the rods 46, as well as to the lower end of the sleeve 32, assures adequate support of the plate 50 and prevents a possible dislodgment of the magnet 42 from the sleeve 32 during operation of the tool 6.

Another magnetic material plate 54 is rigidly secured in the upper end of the sleeve 32 and contacts the top of the core 42. However, the plate 54 is of a size to contact the inner periphery of the sleeve 32 and forms a portion of a magnetic path from the core 42 to the upper end of the sleeve 32.

A circular plate 56 is secured in the counter-bore 24 of the housing 8 on the shoulder 28 above the magnetic unit 30. The plate 56 has a plurality of circumferentially spaced apertures 58 therethrough for the passage of the washing fluid. It will be observed that the apertures 58 are spaced radially inward from the grooves 40 of the magnetic unit 30. The plate 56 also has an aperture 60 in the central portion thereof for loosely receiving the upper portion of a vertically extending rod 62. A nut or head 64 is rigidly secured on the upper end of the rod 62 for contacting the upper surface of the plate 56 as will be hereinafter set forth.

The rod 62 extends downwardly from the plate 56 through apertures 66, 68 and 70, which are formed in the central portions of the plate 54, core 42 and plate 50 respectively to connect magnetically the opposite magnetic poles of the core 42. A counter-bore 72 is formed at the lower end of the aperture 70 to receive the lower head 74 of the rod 62. The head 74 is preferably ground flush with the lower face of the pole plate 50. Also, the weld 52 is ground flush with the lower faces of the pole plate 50 and sleeve 32 to provide a smooth surface over the entire lower end of the magnetic unit 30. It should also be noted that the rod 62 may be constructed out of any desired low retentivity material. If will also be observed in Figure 1 that when the magnetic unit 30 is disposed on the shoulder 26, the upper end of the magnetic unit is disposed in downwardly spaced relation from the plate 56.

Reviewing the details of construction, it will be noted that the magnetic unit 30 provides a bell-shaped magnet comprising the inner magnet core 42 (including the pole plate 50), the upper magnetic plate 54 and the magnetic sleeve 32. Therefore, the magnetic flux will tend to flow through the core 42, plate 54 and sleeve 32. The welding material 52 provides a gap in the magnetic circuit. The aperture 68 extending throughout the length of the core 42 provides a throw-out of magnetic flux at the lower end of the core 42 to concentrate the holding power of the magnetic unit 30 in the vicinity of the outer periphery of the pole plate 50. Furthermore, it has been applicant's experience that the use of the magnetic material rod 68 through the center of the magnet core 42 substantially facilitates the throw-out of magnetic flux and increases the holding power of the magnetic unit 30.

This phenomenon is achieved because the magnetically permeable rod 62 becomes, in effect, an induced magnet providing a short circuit for flux flow between the opposite magnetic poles of the core 42. Therefore, since the flux flow from the lower end of the magnet core is distributed not only to sleeve 32 but also to the rod 62 the center of flux flow from the lower end of the core is moved outwardly and the maximum flux concentration is thrown out toward the outer periphery of the pole plate. Additionally, if the sleeve 32 is circular as shown, the air gap between the prismatic core and the sleeve 32 will be of minimum length at the angles of the polygonal base of the core. In such case, there will be six points of maximum flux density at the lower end of the hexagonal core, i. e. at each angle of the hexagon. Of course, with a concentric hexagonal sleeve the flux concentration will be distributed around the gap.

Operation

Assuming that a pair of drill bit cones 80 (Figure 4) are lost in a well bore 82, the tool 6 is secured on the lower end of a string of drill pipe or tubing (not shown) and lowered through the well bore 82. It will be observed that the magnetic unit 30 will be retained in its lower position on the shoulder 26 as shown in Figure 1 as the tool is lowered. The tool 6 is rotated as it is lowered through the well bore 82 to rotate the mill 18. The mill 18 tends to guide the tool 6 through the bore 82, and also contacts any articles that may be loose in the well bore to guide the articles into the lower end of the housing 8. Simultaneously with the lowering and rotation of the tool 6, washing fluid is pumped down through the drill string and the passageway 14 of the sub 12. As the washing fluid enters the upper end of the housing 8 it flows downwardly through the inlet apertures 58, and then outwardly into the grooves or passageways 40. The grooves 40 conduct the washing fluid down around the outer periphery of the magnetic unit 30 and jet the washing fluid from the lower end of the tool 6. The fluid discharging from the lower ends of the grooves 40 tends to agitate and expose the fish 80, whereby the fish will be contacted by the pole plate 50.

As the tool 6 reaches the bottom of the well bore 82, the mill 18 directs the cones 80 into the lower end of the housing 8 into contact with the pole plate 50. Further downward movement of the tool 6 causes the mill 18 to dig into the lower end of the well bore 82, while the rock or soil 84 at the lower end of the well bore inwardly of the mill 18 remains intact. Since the cones 80 will be held at a fixed height by the soil 84, the cones 80 will also hold the magnetic unit 30 in a fixed vertical position while the housing 8 and mill 18 are moved downwardly thereover. As a result, the magnetic unit 30 is moved relatively upward in the housing 8 into contact with the upper plate 56. When this condition occurs, the upper end of the sleeve 32 and plate 54 function as a valve to cover the apertures 58 and restrict the flow of washing fluid through the tool 6. This restriction to the flow of the washing fluid is transmitted through the string of drill pipe to indicate an increase in the washing fluid pressure at the surface of the well. Therefore, when the driller observes a sharp increase in the washing fluid pressure he will be advised that the tool 6 has contacted the cones or fish 80. The tool 6 can then be removed from the well bore 82, with the fish 80 being held thereto by the unit 30, and the normal drilling operation may continue.

Figure 4:
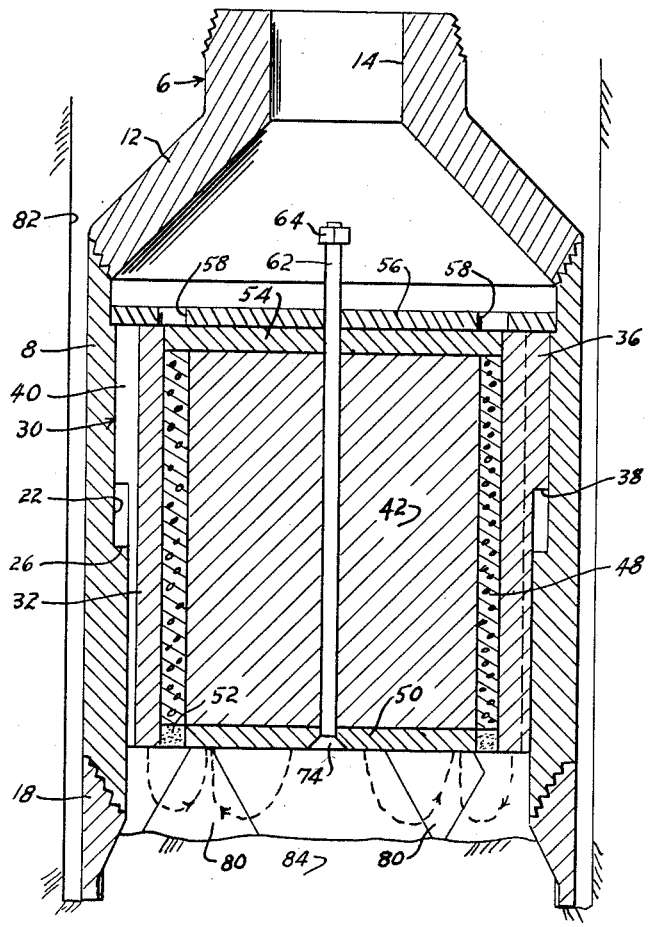
Figure 4 is another vertical sectional view of the tool illustrating the operation of the tool upon contact with a plurality of fish.
Figure 3:
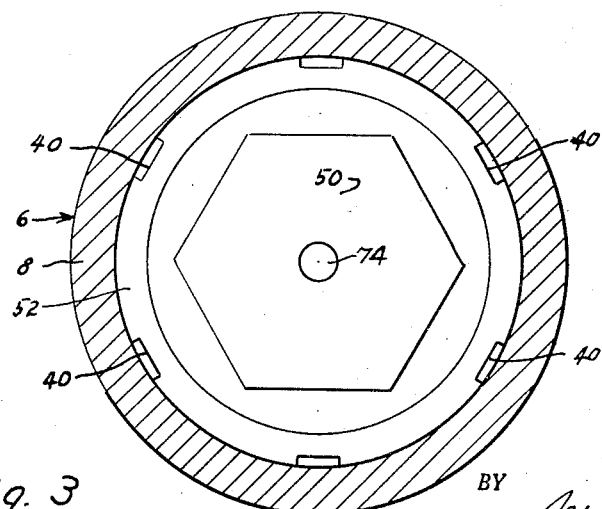
Figure 3 is another sectional view as taken along lines 3—3 of Figure 1.

The tubular construction of the magnet core 42 with the short circuit therethrough provided by rod 62, in combination with the magnetic material sleeve 32, provides a control of the magnetic flux wherein the lines of force are arranged as indicated by the dotted lines in Figure 4. It will be observed that one group of the lines of force extend from around the edge of the aperture 68 or bolt 62 downwardly and then upwardly to the outer portion of the pole plate 50. The second group of lines of force extend from the lower end of the sleeve 32 downwardly and then upwardly to the outer portion of the pole plate 50. As a result, the lines of force are concentrated over a large, substantially annular shaped area of the pole plate 50 near the outer edge thereof with, in the case of a circular sleeve, the maximum flux density being situated at the six angles of the hexagonal core. It will be readily apparent, therefore, that any fish 80 attracted by the magnetic unit 30 will be attracted to the pole plate 50 in the area of the largest flux concentration. Also, since the fish 80 are attracted to the outer edge of the pole plate 50, as contrasted with the center of the pole plate, the maximum number of fish may be attracted and held.

The non-magnetic weld or ring 52 presents a high reluctance to direct passage of the magnetic flux between the lower end of the sleeve 32 and the pole 50, and causes the flux to be disbursed downwardly where it will attract the fish 80, even before the fish 80 are directly contacted by the magnetic unit 20. It will also be observed that the fluid passageways 40 are arranged in such a position that any small metallic particles (not shown) which may become lodged therein will not short-circuit the magnetic unit 30. Furthermore, the movement of the magnetic unit 30 during operation of the tool 6 will tend to prevent obstruction of the passageways 40.

As previously noted, the shoulder 38 of the sleeve 32 normally rests on the shoulder 26 of the housing 8 to support the magnetic unit 30. However, should the shoulders 26 and 38 become damaged or worn for any reason, the upper head 64 of the rod 62 will contact the plate 56 to limit the downward movement of the magnetic unit 30 and prevent loss of the magnetic unit. In addition to the reciprocating movements of the unit 30 described above, the unit may rotate in the housing 8. Therefore, the pole plate 50 may easily ride on the fish 80 during downward movement of the mill 18 over the fish, without the imposition of strains or stresses on the magnetic unit 30. For example, the fish 80 may be lodged in the rock or soil 84 to resist rotation of the unit 30 when the fish are contacted by the pole plate 50. The slidable fit of the sleeve 32 in the housing 8 then permits substantially free rotation of the housing 8 around the unit 30.

It will also be observed in Figure 4, that when the unit 30 is in an upper position against the stop plate 56, the lower ends of the grooves 40 are disposed above the lower end of the housing 8. Therefore, the washing fluid will be jetted from above the fish 80, and the rotation of the housing 8 and mill 18 around the unit 30 will disperse the fluid to effectively wash the fish 80.

Another novel feature of the present invention is the interchangeability of the magnetic unit 30. The outer housing 8 is sometimes damaged during use. When this occurs, the unit 30 may be removed and utilized in another similar sized housing 8, without disturbing the holding power or flux field of the magnetic unit.

From the foregoing it is apparent that the present invention provides a novel magnetic fishing tool having the maximum holding capacity. The flux concentration at the lower end of the tool is spread over the largest possible area, whereby the maximum number of fish may be attracted and held by the tool. The magnetic unit will not be easily short circuited and will retain its holding power over a maximum period of time. Furthermore, the tool provides an increase in the washing fluid pressure when a fish has been engaged to notify the driller.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A fishing tool, comprising a tubular housing, a sleeve of magnetic material reciprocably disposed in said housing, spaced stops in said housing limiting reciprocation of said sleeve, a tubular magnet core in said sleeve, said core having a smaller outer diameter than the inner diameter of said sleeve, non-magnetic means in said sleeve around said core, and a magnetic plate connecting the upper end of said core to said sleeve, whereby a portion of a magnetic circuit is formed to provide a flux concentration around the lower end of said core.

2. A fishing tool, comprising a tubular housing, a sleeve of magnetic material slidingly disposed in said housing, a plate of magnetic material closing the upper portion of said sleeve, a tubular magnetic core in said sleeve in contacting relation with said plate, said core being of smaller diameter than the inner diameter of said sleeve to provide an annular space between said sleeve and said core, non-magnetic material in said space, an annular pole plate at the lower end of said core formed of wear-resistant magnetic material, and a ring of non-magnetic material connecting the outer edge of said pole plate to said sleeve to provide a magnetic gap between the lower end of said core and said sleeve, whereby magnetic flux is concentrated around the edge of said pole plate.

3. A fishing tool, comprising a tubular housing, a sleeve of magnetic material slidingly disposed in said housing, magnetic material plates closing the upper and lower ends of said sleeve, the plate at the lower end being secured to said sleeve by non-magnetic welding material to provide a ring of non-magnetic material between said sleeve and said lower plate, a plurality of non-magnetic bars secured in circumferentially spaced relation to the inner periphery of said sleeve between said plates, and a tubular magnetic core in said sleeve inwardly of said bars, said core being in contact with said plates to form a portion of a magnetic circuit between said lower plate, said core, said upper plate and said sleeve, whereby magnetic flux is concentrated around the edge of said lower plate.

4. A fishing tool for recovering articles from a well bore, comprising a tubular housing having its lower end open and a fluid inlet above the open end, a magnetic unit reciprocally disposed in said housing arranged to open and close said fluid inlet during reciprocation thereof relative to said housing, said magnetic unit having fluid passageways therethrough arranged to communicate with said inlet when said unit is in its lowermost position, said unit having its lower end exposed to the articles in the well bore through the lower open end of said housing, whereby said articles move said unit relatively upward in said housing upon movement of said housing downwardly thereover to close said inlet.

5. A fishing tool, comprising a tubular housing having its lower end open and a fluid inlet above the open end, a magnetic unit reciprocally disposed in said housing arranged to close said inlet in an upper position and open said inlet in a lower position thereof, said unit having passageways around the outer periphery thereof to conduct fluid from said inlet through said open end when said unit is in a lower position, said unit being exposed through the open end of said housing for contacting fish, whereby said unit is moved relatively upward in said housing by the fish to close said fluid inlet.

6. A fishing tool, comprising a tubular housing having a lower open end, a magnetic unit slidingly disposed in said housing, said magnetic unit comprising a sleeve of magnetic material having fluid passageways therethrough, a magnetic material plate enclosing the upper end of said sleeve, a tubular permanent magnet depending from said plate in inwardly spaced relation to said sleeve for creating a portion of a magnetic circuit between said core, plate and sleeve and providing a concentration of magnetic flux around the lower end of said core exposed through the open end of said housing, and a stop plate secured transversely in said housing above and in the path of movement of said unit, said stop plate having fluid inlet apertures therethrough out of alignment with said fluid passageways, whereby said magnetic unit closes-off said fluid inlets when contacting said stop plate.

7. A fishing tool for removing articles from a well bore, comprising a tubular housing having a lower open end for receiving the articles during downward movement of the tool in the well bore, a plate secured transversely in said housing and having fluid inlets therethrough, and a magnetic unit slidingly disposed in said housing below said plate and being responsive to contact with the articles for relative upward movement in said housing into contact with said plate, said magnetic unit having fluid passageways therethrough out of alignment with said fluid inlets, whereby said unit closes off said inlets upon contact of said unit with said plate.

8. A fishing tool for removing articles from a well bore, comprising a tubular housing having a lower open end for receiving the articles during downward movement of the tool in the well bore, a plate secured transversely in said housing and having fluid inlets therethrough, and a magnetic unit slidingly disposed in said housing below said plate and being responsive to contact with the articles for relative upward movement in said housing into contact with said plate, said magnetic unit comprising a sleeve of magnetic material of a size to slidingly fit in said housing, said sleeve having vertical passageways therethrough out of alignment with said fluid inlets to conduct fluid from said inlets to the lower end of said housing, a plate of magnetic material enclosing the upper end of said sleeve, and a tubular permanent magnet core depending from said magnetic plate in inwardly spaced relation to said sleeve for forming a portion of a magnetic circuit between said core, magnetic plate and sleeve to provide a magnetic flux concentration around the lower, outer edge of said core.

9. A fishing tool for removing articles from a well bore, comprising a tubular housing having a lower open end for receiving the articles during downward movement of the tool in the well bore, a plate secured transversely in said housing and having fluid inlets therethrough, and a magnetic unit slidingly disposed in said housing below said plate and being responsive to contact with the articles for relative upward movement in said housing into contact with said plate, said magnetic unit comprising a sleeve of magnetic material of a size to slidingly fit in said housing, there being vertical passageways between said sleeve and said housing out of alignment with said fluid inlets, magnetic material plates enclosing the upper and lower ends of said sleeve, a ring of non-magnetic material securing said lower plate to said sleeve, and a tubular shaped permanent magnet core secured in said sleeve between said upper and lower plates and being of a smaller diameter than the inner diameter of said sleeve to provide an annular space between said core and said sleeve, whereby a portion of a magnetic circuit is formed by said lower plate, core, upper plate and sleeve to provide a concentration of flux in substantially annular pattern on said lower plate.

10. A fishing tool for removing articles from a well bore, comprising a tubular housing having a lower open end for receiving the articles during downward movement of the tool in the well bore, a plate secured transversely in said housing and having fluid inlets therethrough, and a magnetic unit slidingly disposed in said housing below said plate and being responsive to contact with the articles for relative upward movement in said housing into contact with said plates, said magnetic unit comprising a sleeve of magnetic material of a size to slidingly fit in said housing, there being vertical passageways between said sleeve and said housing out of alignment with said fluid inlets, magnetic material plates enclosing the upper and lower ends of said sleeve, a ring of non-magnetic material securing said lower plate to said sleeve, and a tubular shaped permanent magnet core secured in said sleeve between said upper and lower plates and being of a smaller diameter than the inner diameter of said sleeve to provide an annular space between said core and said sleeve, and a plastic non-magnetic material in said annular space between said core and said sleeve, whereby a portion of a magnetic circuit is formed by said lower plate, core, upper plate and sleeve to provide a concentration of flux in substantially annular pattern on said lower plate.

11. A fishing tool for recovering lost articles from a well bore comprising an outer casing a top plate having fluid inlets therethrough enclosing the upper end of said casing, the lower end of said housing being open, a magnetic unit slidably disposed within said casing, fluid passageways to conduct fluid from said inlets to points below said magnetic unit for discharge through the lower open end of said casing, said magnetic unit being normally spaced below said top plate but being slidable upwardly in response to contact with a lost article into face engagement with said top plate, the top plate engaging surface of said magnetic unit being of sufficient area to cover and close off said inlet.

12. A fishing tool for recovering lost articles from a well bore comprising an outer casing, a top plate having fluid inlets therethrough enclosing the upper end of said casing, the lower end of said casing being open, a magnetic unit slidably disposed within said casing, fluid passageways extending through said magnetic unit to conduct fluid for discharge through the lower end of said casing, said fluid passageways being offset with relation to said inlets, said magnetic unit being normally spaced below said top plate but being slidable upwardly in response to contact with a lost article into face engagement wtih said top plate to cover and close off said inlets.

13. A fishing tool for recovering lost articles from a well bore comprising an outer casing, a top plate disposed across the upper end of said casing, said top plate having within a given area at the center thereof a series of fluid inlets, the lower end of said housing being open, a magnetic unit slidably disposed within said housing, said magnetic unit having an imperforate upper valve surface greater than said given area, fluid passageways between said magnetic unit and said casing to conduct fluid from said inlets for discharge through the lower open end of said casing, said magnetic unit being normally spaced below said top plate but being slidable upwardly in response to contact with a lost article to seat said valve surface against said top plate.

14. A fishing tool comprising a tubular housing, a magnetic material sleeve reciprocably secured in said housing, spaced stop means within said housing limiting reciprocation of said sleeve, a permanent magnet core having ends of opposite polarity secured in said sleeve in inwardly spaced relation thereto, said core having an axial bore through the center thereof, a magnetic material plate interconnecting said sleeve and said core at the upper end thereof to provide a portion of a magnetic circuit through said sleeve, plate and core, and a magnetic material rod extending through said bore and interconnecting the center of the lower end of said core and said magnetic material plate to provide a magnetic path through said core, plate and rod.

15. A fishing tool comprising a tubular housing, a permanent magnet core having ends of opposite polarity reciprocally secured in said housing, said core having an axial bore through the center thereof, spaced stop means within said housing limiting reciprocation of said core, means forming a portion of a magnetic circuit from the upper end of said core downwardly in spaced relation around said core, and magnetic means within said bore interconnecting the centers of the ends of said core to provide a magnetic path therebetween.

16. In a fishing tool having a permanent magnet core having ends of opposite polarity, a sleeve of magnetic material encircling said core spaced concentrically therefrom and coextensive therewith, and a pole piece of magnetic material interconnecting the upper ends of said core and said sleeve, the combination with said fishing tool of an axial bore through the center of said core and a rod of magnetic material extending through said bore and interconnecting the centers of said ends of said core to provide a magnetic path therebetween.

References Cited in the file of this patent

UNITED STATES PATENTS

| | | |
|---|---|---|
| 2,522,294 | Noble | Sept. 12, 1950 |
| 2,613,980 | Hawkins | Oct. 14, 1952 |
| 2,654,627 | Story | Oct. 6, 1953 |
| 2,668,077 | Kirby | Feb. 2, 1954 |